US007738696B2

(12) United States Patent
Bannai

(10) Patent No.: US 7,738,696 B2
(45) Date of Patent: Jun. 15, 2010

(54) IMAGE PROCESSING APPARATUS AND METHOD FOR EXTRACTING A DOCUMENT AREA

(75) Inventor: Nobuyuki Bannai, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 965 days.

(21) Appl. No.: 11/466,879

(22) Filed: Aug. 24, 2006

(65) Prior Publication Data
US 2007/0053610 A1    Mar. 8, 2007

(30) Foreign Application Priority Data
Sep. 6, 2005    (JP)    ............... 2005-257360

(51) Int. Cl.
*G06K 9/00* (2006.01)
*G06K 9/34* (2006.01)

(52) U.S. Cl. .................. 382/164; 382/163; 382/171

(58) Field of Classification Search .................. None
See application file for complete search history.

(56) References Cited

U.S. PATENT DOCUMENTS

| | | | | |
|---|---|---|---|---|
| 4,847,689 | A * | 7/1989 | Yamamoto et al. | 358/515 |
| 5,850,490 | A * | 12/1998 | Johnson | 382/306 |
| 6,208,744 | B1 * | 3/2001 | Ishige et al. | 382/100 |
| 6,249,353 | B1 * | 6/2001 | Yoshida et al. | 358/1.9 |
| 6,433,896 | B1 * | 8/2002 | Ueda et al. | 358/488 |
| 6,731,801 | B2 * | 5/2004 | Murakawa et al. | 382/180 |
| 7,227,661 | B2 * | 6/2007 | Matsunoshita | 358/1.15 |
| 7,321,687 | B2 * | 1/2008 | Yamamoto | 382/170 |
| 7,409,907 | B2 * | 8/2008 | Ebisawa et al. | 101/128.4 |
| 2003/0113019 | A1 * | 6/2003 | Nakagawa | 382/187 |
| 2003/0113021 | A1 * | 6/2003 | Shiotani | 382/209 |
| 2003/0169921 | A1 * | 9/2003 | Yamamoto | 382/170 |
| 2003/0179412 | A1 * | 9/2003 | Matsunoshita | 358/3.28 |
| 2005/0184966 | A1 * | 8/2005 | Katsuyama | 345/173 |
| 2005/0289460 | A1 * | 12/2005 | Tomita et al. | 715/530 |

FOREIGN PATENT DOCUMENTS

| | | |
|---|---|---|
| JP | 03-188587 A | 8/1991 |
| JP | 08-237537 A | 6/1996 |
| JP | 2004-030430 A | 1/2004 |

* cited by examiner

*Primary Examiner*—Yuzhen Ge
(74) *Attorney, Agent, or Firm*—Canon U.S.A., Inc. I.P. Division

(57) ABSTRACT

An image processing apparatus and method include providing a same label number to adjacent black pixels that form a group of black pixels, the label number provided to each group of black pixels being unique, the black pixels being included in binary read data, determining, when the number of black pixels in a group of black pixels counted on the basis of the unique label number is less than a predetermined number, that the black pixels with the unique label number are noise and removing the black pixels from targets to be processed, acquiring coordinate information on at least one of black pixels that remain after noise has been removed, and extracting a document area on the basis of the acquired coordinate information.

13 Claims, 10 Drawing Sheets

ABC INC.

Taro Shimomaruko

XX-YY-ZZ, Shimomaruko, Ohta-ku, Tokyo
03-aaaa-bbbb

ABC

FIG. 9

| 0 | 0 | 0 | 0 | 0 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 1 | 1 | 0 | 0 | 0 | 0 | 2 | 2 | 2 | 2 | 0 | 0 | 0 | 0 | 0 | 0 |
| 0 | 0 | 0 | 1 | 1 | 0 | 0 | 0 | 0 | 2 | 2 | 2 | 2 | 2 | 0 | 0 | 0 | 0 | 0 |
| 0 | 0 | 1 | 1 | 1 | 1 | 0 | 0 | 0 | 2 | 0 | 0 | 0 | 2 | 0 | 0 | 0 | 0 | 0 |
| 0 | 0 | 1 | 1 | 1 | 1 | 0 | 0 | 0 | 2 | 0 | 0 | 0 | 2 | 0 | 0 | 0 | 0 | 0 |
| 0 | 0 | 1 | 0 | 0 | 1 | 0 | 0 | 0 | 2 | 0 | 0 | 0 | 2 | 2 | 0 | 0 | 0 | 0 |
| 0 | 0 | 1 | 0 | 0 | 1 | 0 | 0 | 0 | 2 | 2 | 2 | 2 | 2 | 0 | 0 | 0 | 0 | 0 |
| 0 | 0 | 1 | 0 | 0 | 1 | 0 | 0 | 0 | 2 | 2 | 2 | 2 | 2 | 0 | 0 | 0 | 0 | 0 |
| 0 | 1 | 1 | 1 | 1 | 1 | 0 | 0 | 0 | 2 | 0 | 0 | 0 | 2 | 2 | 0 | 0 | 0 | 0 |
| 0 | 1 | 1 | 1 | 1 | 1 | 0 | 0 | 0 | 2 | 0 | 0 | 0 | 0 | 2 | 2 | 0 | 0 | 0 |
| 0 | 1 | 0 | 0 | 0 | 1 | 0 | 0 | 0 | 2 | 0 | 0 | 0 | 0 | 2 | 0 | 0 | 0 | 0 |
| 0 | 1 | 0 | 0 | 0 | 1 | 0 | 0 | 0 | 2 | 0 | 0 | 0 | 0 | 2 | 2 | 0 | 0 | 0 |
| 0 | 1 | 0 | 0 | 0 | 1 | 0 | 0 | 0 | 2 | 2 | 2 | 2 | 2 | 2 | 0 | 0 | 0 | 0 |
| 0 | 1 | 0 | 0 | 0 | 1 | 0 | 0 | 0 | 2 | 2 | 2 | 2 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 |

FIG. 10

IMAGE PROCESSING APPARATUS AND METHOD FOR EXTRACTING A DOCUMENT AREA

BACKGROUND OF THE INVENTION

1. Field of the Invention

The present invention relates to an image processing apparatus and a control method therefor, and more particularly, to an image processing apparatus for extracting a document area, reading the extracted document area, and storing or printing the read image.

2. Description of the Related Art

For use in known image processing apparatuses, many algorithms for detecting and cutting out a rectangular area from an original image (see, for example, Japanese Patent Laid-Open Nos. 8-237537 (Page No. 15 and FIG. 10) and 2004-30430 (Page No. 17 and FIG. 9)) have been proposed. In addition, an image processing apparatus for performing binarization processing and labeling processing is also known (see, for example, Japanese Patent Laid-Open No. 3-188587 (Page Nos. 5 and 6, and FIGS. 1 and 2)).

An image processing apparatus described in Japanese Patent Laid-Open No. 8-237537 performs outline extraction processing and searches for a rectangular area by searching for a portion having a straight outline. However, in a noisy environment, it is difficult to detect the straight portion of a rectangular outline and to further detect a single rectangle by associating four straight lines that form the rectangular outline.

In order to increase detection accuracy in a noisy environment, an image processing apparatus described in Japanese Patent Laid-Open No. 2004-30430 creates histograms of the number of black pixels in horizontal and vertical directions, and uses the trapezoidal approximation to detect whether a rectangle is present and to detect the inclination direction thereof from the histograms. However, if a boundary between a document area and a background is blurred (if a color difference between a document and a pressure plate for a platen glass is small in a reader), it is difficult to detect a document area.

In a known technique described in Japanese Patent Laid-Open No. 3-188587, a histogram of binary image data is generated. Only black pixels of a predetermined size or greater in the histogram remain. However, if there are a plurality of clusters of pixels which are provided with label numbers in a document of a single page, and if document areas are cut out on a label number-by-label number basis, a plurality of pages is cut out.

SUMMARY OF THE INVENTION

The present invention provides an image processing apparatus and a control method capable of extracting a plurality of clusters of black pixels which are provided with label numbers from a single document image so that these extracted clusters can be fit into a single document.

According to an exemplary embodiment of the present invention, there is provided an image processing apparatus for extracting a document area which includes a reading unit for reading a document, a binarizing unit for binarizing read data acquired by the reading unit, a labeling unit for providing a same label number to adjacent black pixels that form a group of black pixels, the label number provided to each group of black pixels is unique and the black pixels are included in the read data binarized by the binarizing unit, a noise removing unit for, when the number of black pixels in a group of black pixels counted on the basis of the unique label number is less than a predetermined number, determining that the black pixels provided with the unique label number are noise and removing the black pixels provided with the unique label number from targets to be processed, a coordinate acquiring unit for acquiring coordinate information on at least one of black pixels that remain after noise has been removed by the noise removing unit, and an extracting unit for extracting a document area on the basis of the coordinate information acquired by the coordinate acquiring unit.

According to an additional exemplary embodiment of the present invention, there is further provided a method of controlling an image processing apparatus for extracting a document area, the method including reading a document, binarizing read data; providing a same label number to adjacent black pixels that form a group of black pixels, the label number provided to each group of black pixels being unique and the black pixels being included in the binarized read data, determining, when the number of black pixels in a group of black pixels counted on the basis of the unique label number is less than a predetermined number, that the black pixels provided with the unique label number are noise and removing the black pixels provided with the unique label number from targets to be processed, acquiring coordinate information on at least one of black pixels that remain after noise has been removed, and extracting a document area on the basis of the acquired coordinate information.

Further features of the present invention will become apparent from the following description of exemplary embodiments with reference to the attached drawings.

BRIEF DESCRIPTION OF THE DRAWINGS

FIG. 4 is a diagram showing exemplary filters used in the exemplary embodiment.

FIG. 7 is a diagram showing an exemplary extraction result according to the exemplary embodiment.

FIG. 9 is a diagram showing a label number control table.

FIG. 10 is a diagram showing labeled images after integration processing has been performed.

DESCRIPTION OF THE EMBODIMENT

An exemplary embodiment of the present invention will now be described.

Figure 1:
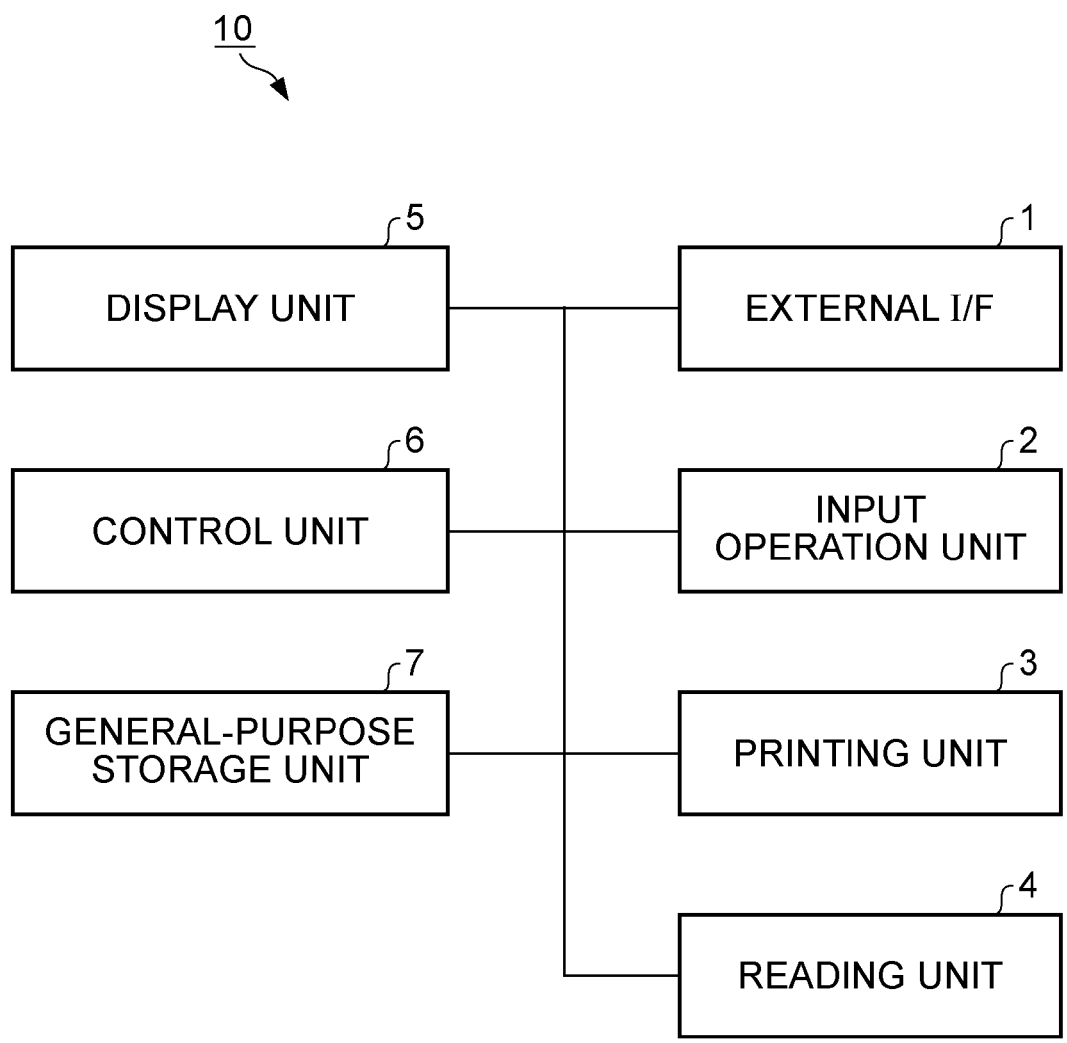
FIG. 1 is a block diagram showing an image processing apparatus 10 for detecting a document area in original image data according to an exemplary embodiment of the present invention.

FIG. 1 is a block diagram showing an image processing apparatus 10 for detecting a document area in original image data according to an exemplary embodiment of the present invention.

The image processing apparatus 10 includes an external interface unit 1, an input operation unit 2, a printing unit 3, a reading unit 4, a display unit 5, a control unit 6, and a general-purpose storage unit 7.

The external interface unit 1 serves as an interface for inputting image data or the like obtained by a an image capture device, i.e., digital camera, into the image processing apparatus 10, and is typically provided with slots for various memory cards and a USB connector for connection to the image capture device or a PC. Here, the slots include a PCM-CIA slot and a dedicated slot capable of enabling physical connection to various memory cards. The external interface unit 1 may include a noncontact interface such as an IrDA port (infrared communication port) for data transmission.

The input operation unit 2 enables a user to operate the image processing apparatus 10.

The printing unit 3 serves as an ink jet printer for printing data transmitted from a PC or a memory card connected to the external interface unit 1 and image data read by the reading unit 4. The printing unit 3 is not limited to an ink jet printer, and any type of printer that would enable practice of the present invention is applicable.

The reading unit 4 serves as a CCD or CIS color scanner for reading an original, i.e., silver halide photograph, magazine, paper document, etc. as image data (digital data).

The display unit 5 displays the read image data, the status information of the image processing apparatus 10, information input by a user using the input operation unit 2, etc.

Figure 2:
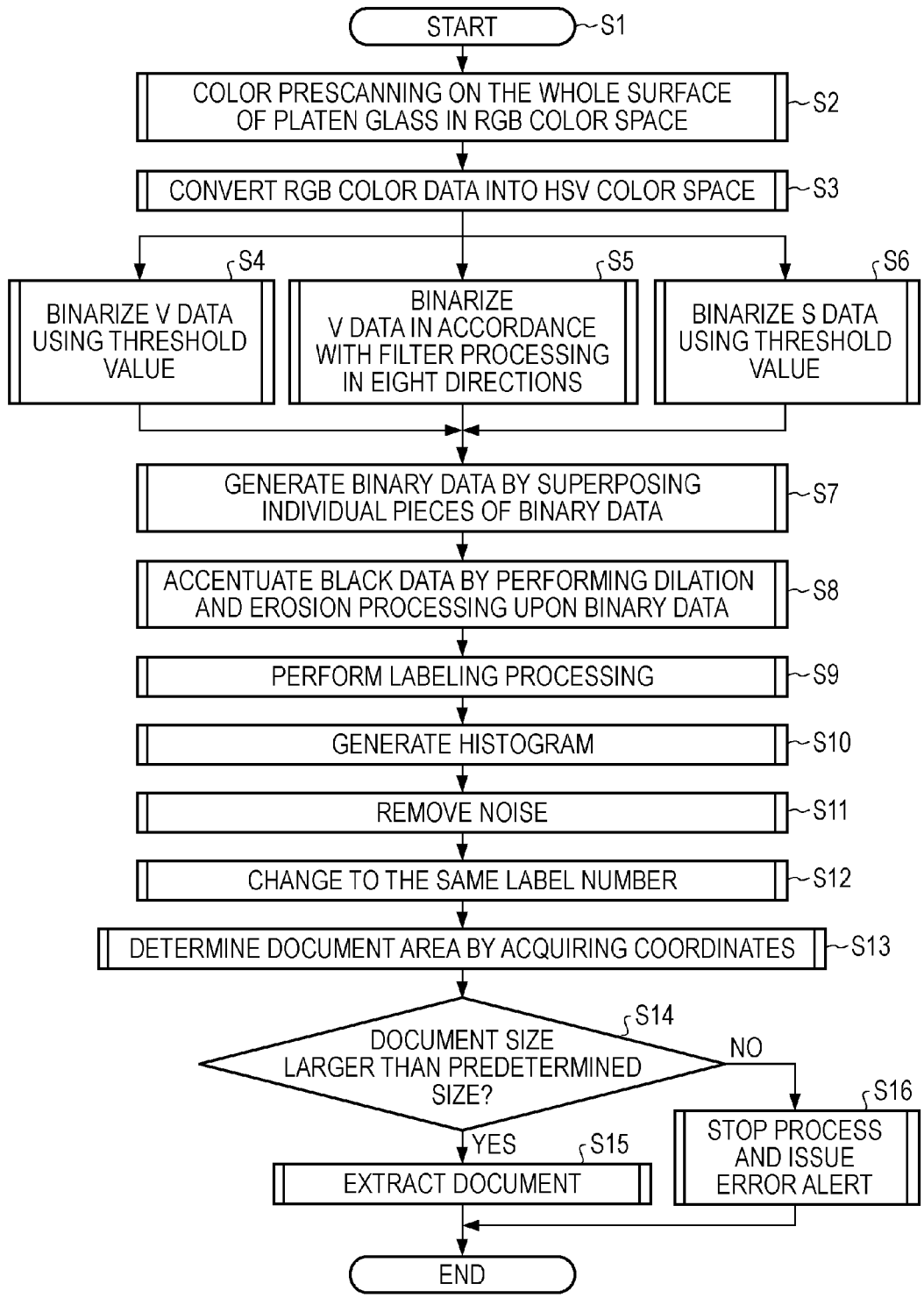
FIG. 2 is a flowchart showing a document area detecting operation according to the exemplary embodiment.

The control unit 6 performs various control procedures for controlling the image processing apparatus 10, for example, the procedure shown in FIG. 2, and acquires the statuses of the image processing apparatus 10 using various sensors.

The general-purpose storage unit 7 stores a program or data for achieving various control means for controlling the image processing apparatus 10, and is used as a work area where a control operation is performed as appropriate.

Next, a document area detecting operation according to the exemplary embodiment will be described.

FIG. 2 is a flowchart showing the document area detecting operation according to the exemplary embodiment.

In step S1, the process starts, and the image processing apparatus 10 is in a standby state ready for a user's operation.

As a result of the user's operation, if it is determined that document area detection is required, the process proceeds to step S2. In step S2, pre-reading processing is performed in which a document is read at a resolution of 75 dpi using the RGB color system without adoption of a color system and a resolution specified by the user. The resolution is not limited to the resolution of 75 dpi, and another resolution may be used, depending on the specification of a reading sensor used in the image processing apparatus 10. In order to enhance the speed of analysis processing in the document area detection, the document is read at a resolution lower than that used in main reading processing.

Figure 3:
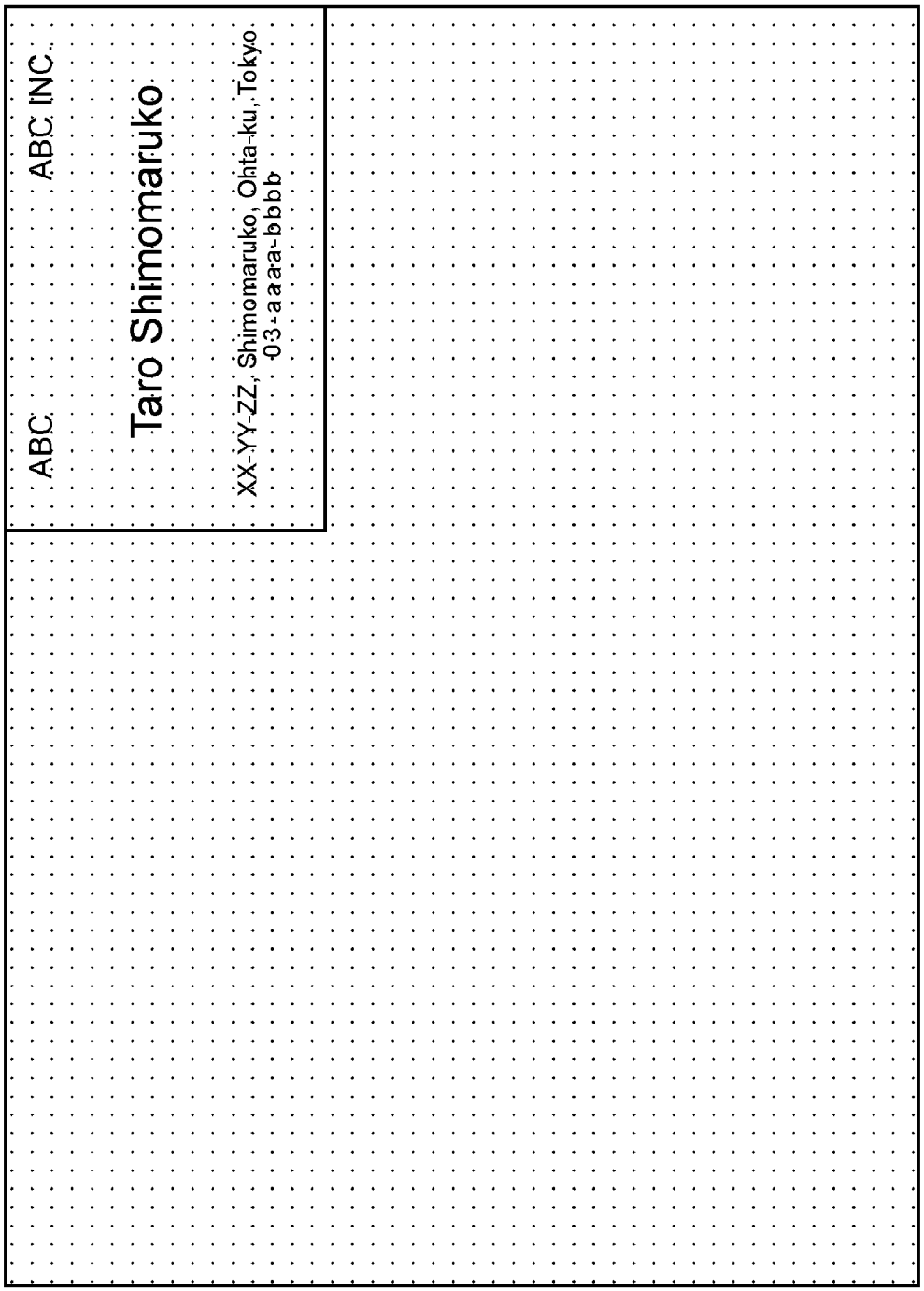
FIG. 3 is a diagram showing image data acquired by reading a single business card placed on an A4-size platen glass at a resolution of 75 dpi using the RGB color system.

FIG. 3 is a diagram showing image data acquired by reading a single business card placed on an A4-size platen glass at a resolution of 75 dpi using the RGB color system.

Returning to FIG. 2, in step S3, data read at a resolution of 75 dpi using the RGB color system in the pre-reading processing in step S2 is converted into HSV color space data, the HSV color space including color saturation (S) and color value (V) information. Color space including color saturation (S) and color value (V) information is not limited to the HSV color space. The data may be converted into data of any color space that includes color saturation (S) and color value (V) information.

There are various methods of converting the RGB color space into the HSV color space, but in the image processing apparatus 10, the following equation for converting the RGB color space into a color space including color difference (H), color saturation (S), and color value (V) information is used.

$$H = \begin{cases} 0 & (\text{when } \max(R, G, B) = \min(R, G, B)) \\ ((G - B)/(\max(R, G, B) - \min(R, G, B))) \times 60 & (\text{when } \max(R, G, B) = R) \\ (2 + (B - R)/(\max(R, G, B) - \min(R, G, B))) \times 60 & (\text{when } \max(R, G, B) = G) \\ (4 + (R - G)/(\max(R, G, B) - \min(R, G, B))) \times 60 & (\text{when } \max(R, G, B) = B) \end{cases}$$ [Equation 1]

$$S = \begin{cases} 0 & (\text{when } \max(R, G, B) = \min(R, G, B)) \\ (\max(R, G, B) - \min(R, G, B))/\max(R, G, B) & (\text{when } \max(R, G, B) \neq \min(R, G, B)) \end{cases}$$ [Equation 2]

$V = \max(R, G, B)$ where max (R, G, B) and min (R, G, B) indicate the maximum and minimum values of each element value, respectively. Each data value is scale-converted so that it can remain within the range of zero to 255 (integer value).

Next, the processing operations of steps S4 through S6 are performed in parallel.

In step S4, the color value (V) component data of the HSV color space data acquired in step S3 is binarized using a threshold value $\tau$, whereby binary data Binary 1 can be acquired. If the value of the color value (V) component data is smaller than the threshold value $\tau$, the color value (V) component data is defined as black (black is denoted as 1 in the following equation). If the value of the color value (V) component data is greater than or equal to the threshold value $\tau$, the color value (V) component data is defined as white (white is denoted as 0 in the following equation).

$$Binary1 = \begin{cases} 1 & (\text{when } V < \tau) \\ 0 & (\text{when } V \geq \tau) \end{cases}$$ [Equation 3]

In step S5, the color value (V) component data of the HSV color space data acquired in step S3 is divided on a 3×3 window-by-3×3 window basis.

FIG. 4 is a diagram showing exemplary filters used in the exemplary embodiment.

As shown in FIG. 4, binarization processing is performed using the threshold value τ upon the values of Binary $2i$ (i=1 to 8) acquired by multiplying the color value (V) component data by the factors of eight Kirsch edge detection filters 301 through 308.

The filters 301 through 308 shown in FIG. 4 serve as filters (each filter has a 3×3 matrix) for detecting edges from above, upper left, left, lower left, below, lower right, right, and upper right, respectively. The values of the Binary $2i$ (i=1 to 8) acquired by multiplying the color value (V) component data by the factors of individual filters are superposed by performing the logical OR operation upon the values. Consequently, binary data Binary 2 including information on edges in all directions can be obtained.

$$Binary2 = \begin{cases} 1 & \text{(when } V < \tau) \\ 0 & \text{(when } V \geq \tau) \end{cases} \qquad \text{[Equation 4]}$$

where $i = 1 \sim 8$.

$Binary2 = Binary21 \cup Binary22 \cup$ $Binary23 \cup Binary24 \cup Binary25 \cup$ $Binary26 \cup Binary27 \cup Binary28$ In the present application, Kirsch filters are used as edge detection filters, but other representative edge detection filters or improved edge detection filters may be used. The divided window size is not limited to the 3×3 size, and another size may be applied.

Returning to FIG. 2, in step S6, the color saturation (S) component data of the HSV color space data acquired in step S3 is binarized using a threshold value k, whereby binary data Binary 3 can be obtained. If the value of the color saturation (S) component data is smaller than the threshold value k, the color saturation (S) component data is defined as black (1). If the value of the color saturation (S) component data is greater than or equal to the threshold value k, the color saturation (S) component data is defined as white (0).

$$Binary3 = \begin{cases} 1 & \text{(when } S < \kappa) \\ 0 & \text{(when } S \geq \kappa) \end{cases}$$

Figure 5:
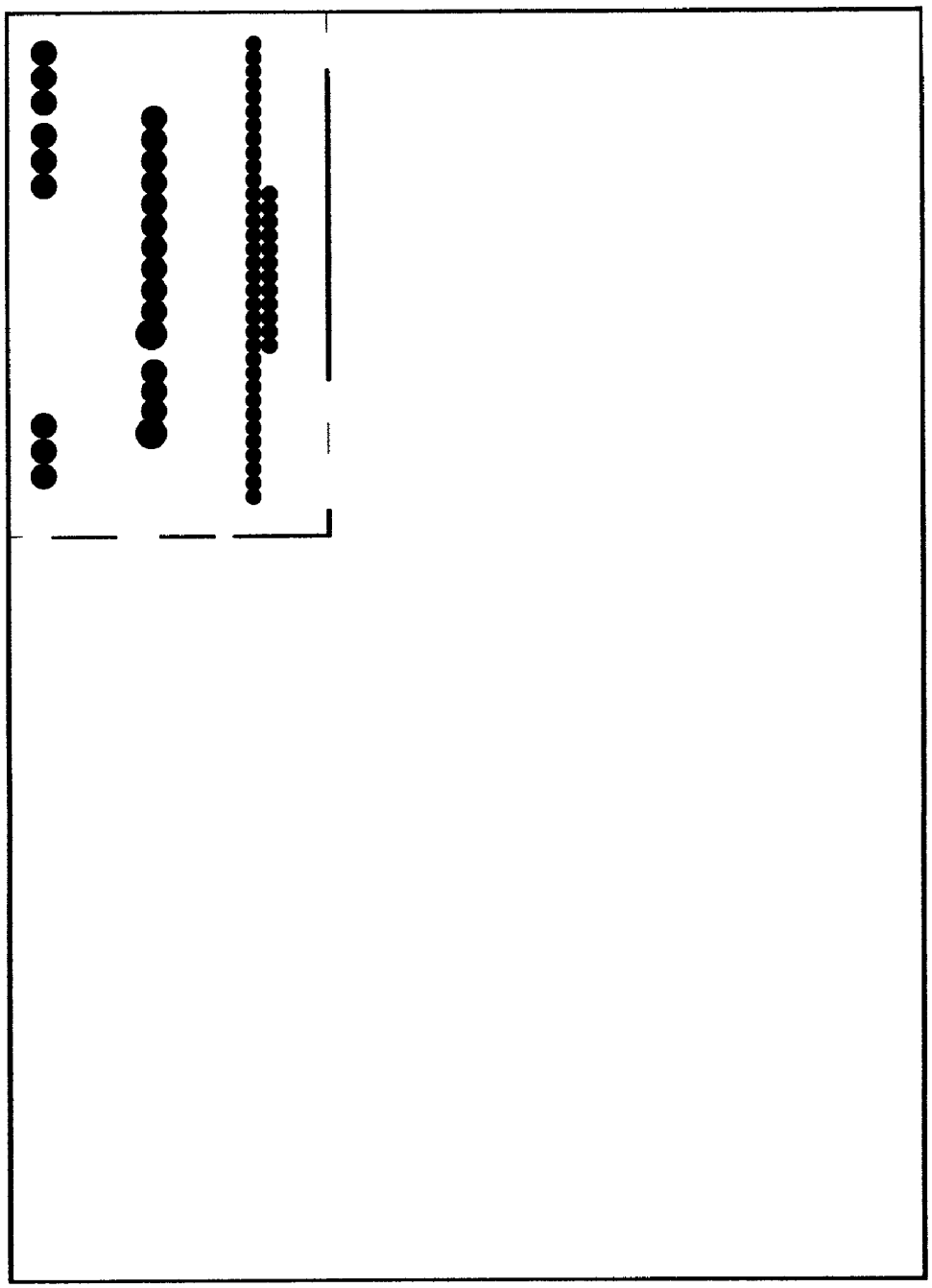
FIG. 5 is a diagram showing binary image data that is a result of an arithmetic operation performed in step S7.

FIG. 5 is a diagram showing binary image data that is a result of an arithmetic operation performed in step S7. In step S7, the binary data Binary 1 to 3 respectively acquired in steps S4 through S6 are superposed by performing a logical OR operation. Consequently, final binary data Binary (Binary=Binary 1 ∪ Binary 2 ∪ Binary 3) can be obtained (FIG. 5). ∪ indicates set-theoretic union.

In step S8, dilation and erosion processing for black pixel data is continuously performed a plurality of times upon the binary data Binary acquired in step S7. Consequently, the broken edge portion of the document which is represented as a dotted line can be restored, whereby the document area of the document can be accurately detected. In the dilation processing, the binary data Binary is divided on a 3×3 window-by-3×3 window basis. If any black pixel (1) is present in the window, the dilation processing is performed by setting the center pixel of the window as a black pixel (1). In the erosion processing, the binary data Binary is divided on a 3×3 window-by-3×3 window basis. If any white pixel (0) is present in the window, the erosion processing is performed by setting the center pixel of the window as a white pixel (0).

In this specification, the 3×3 window size is used, but another size may be applied.

In step S9, a label number is provided to each black pixel included in the finally obtained binary data. At this time, the same label number is provided to each of adjacent black pixels. That is, the same label number is provided on a consecutive black pixel-by-pixel basis (black pixel cluster-by-cluster basis).

In step S10, a histogram of the number of pixels is created on a label number-by-label number basis, the label number provided in step S9. In step S11, if a pixel group, in which pixels with the same label numbers are included, has fewer pixels than a predetermined number of pixels, the pixel group is determined as noise and is then removed from targets to be processed.

Figure 6:
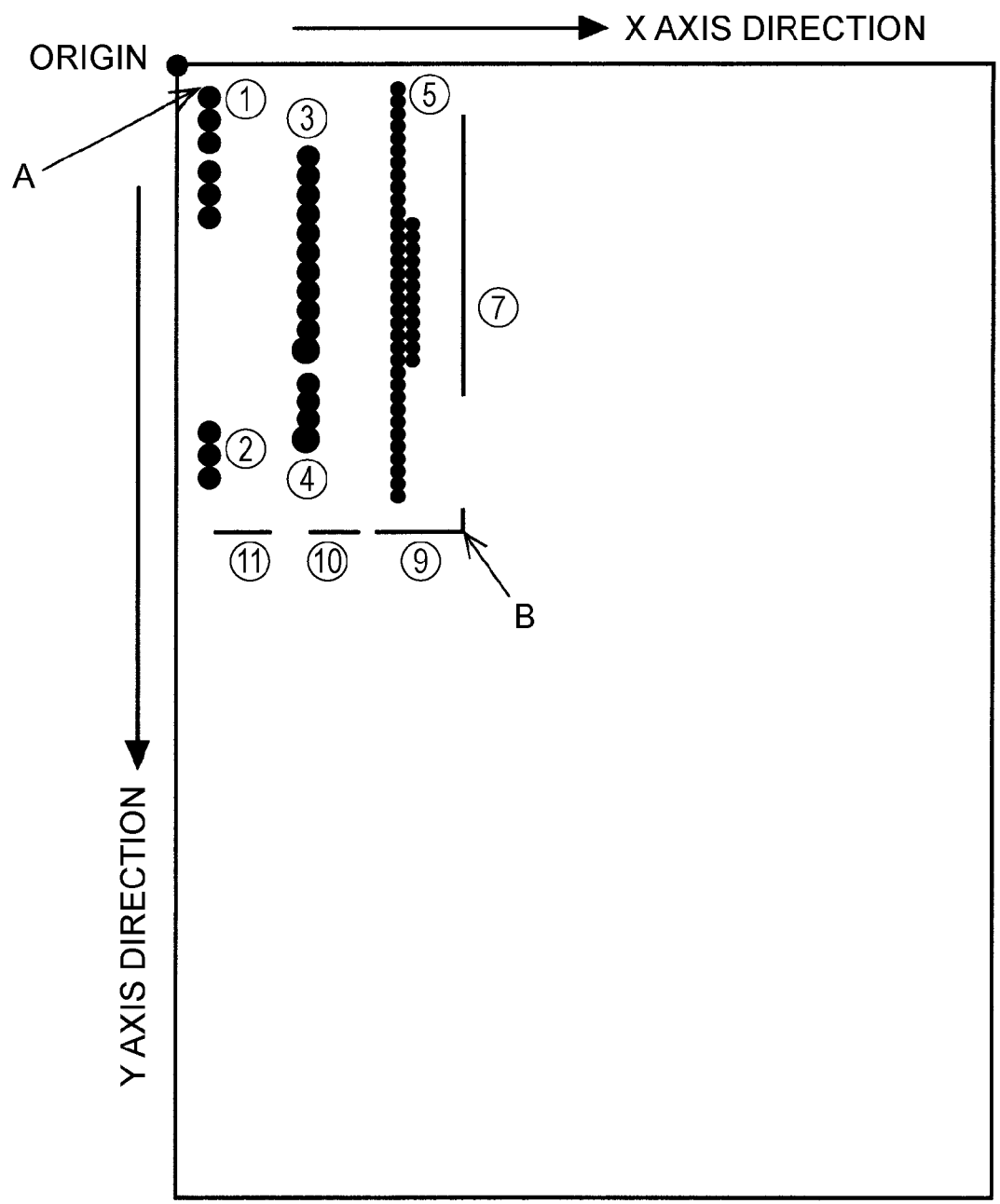
FIG. 6 is a diagram showing labeled images on a label number-by-label number basis after noise has been removed according to the exemplary embodiment.

FIG. 6 is a diagram showing labeled images on a label number-by-label number basis after noise has been removed according to the exemplary embodiment. Circled figures shown in FIG. 6 denote exemplary label numbers. Among label numbers 1 through 11, label numbers 6 and 8 are not shown in FIG. 6. The reason for this is that label images with label numbers 6 and 8 were removed as noise.

The above-described term "label image" refers to a cluster of pixels with the same label number.

Next, description about the label number and the label image will be given.

Figure 8:
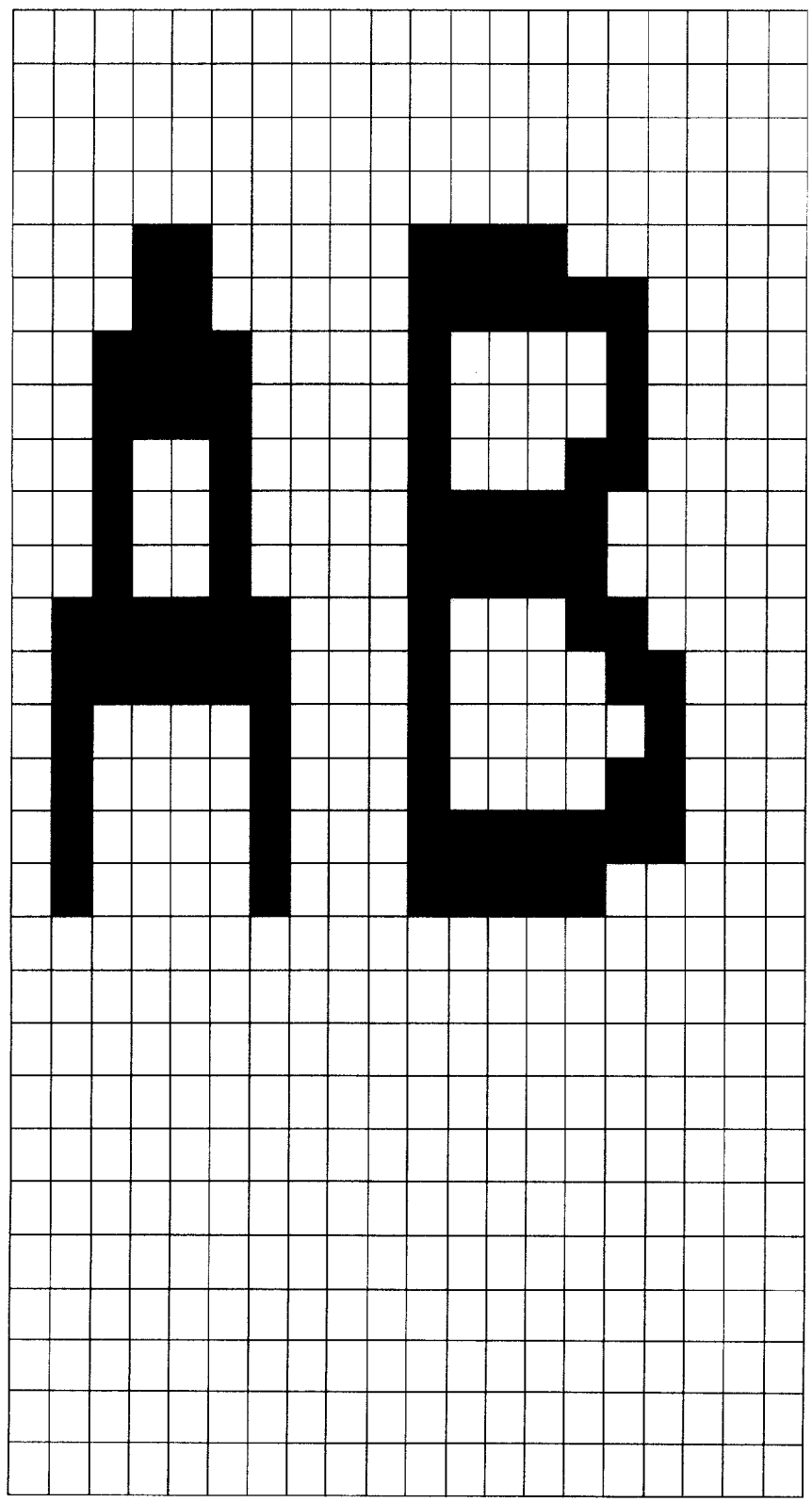
FIG. 8 is a diagram showing binary image data.

FIG. 8 is a diagram showing each pixel included in binary image data that is used for describing a label number control table of binary image data. Referring to FIG. 8, a small quadrangle indicates one pixel.

FIG. 9 is a diagram showing a label number control table for controlling label numbers.

The label number control table has a single blank space for entering a number, for each pixel included in the image data. The blank space for entering a number is associated with a pixel and is placed at the same position as the pixel. Referring to FIG. 9, label numbers 1 and 2 are individually provided to binary image data included in the portions of the characters A and B.

In FIG. 9, in order to simply show the fact that the position of the blank space for entering a number is the same as the position of the corresponding pixel, the blank spaces corresponding to the positions of pixels included in the portions of the characters A and B are shown using a gray color (half-tone dot meshing has been performed upon the blank spaces). The label number control table shown in FIG. 9 is stored in the general-purpose storage unit 7 and is rewritten by the control unit 6.

Returning to FIG. 2, in step S12, the same label number is newly provided to all remaining black pixels with label numbers included in binary data from which noise was removed in accordance with the noise removing processing performed in step S11. That is, it can be presumed that the clusters of black pixels with label numbers which are remaining after the processing of steps S1 to S11 have been completed are not noise but individual parts of the document image. Accordingly, these clusters are integrated as a single document.

Figure 10:
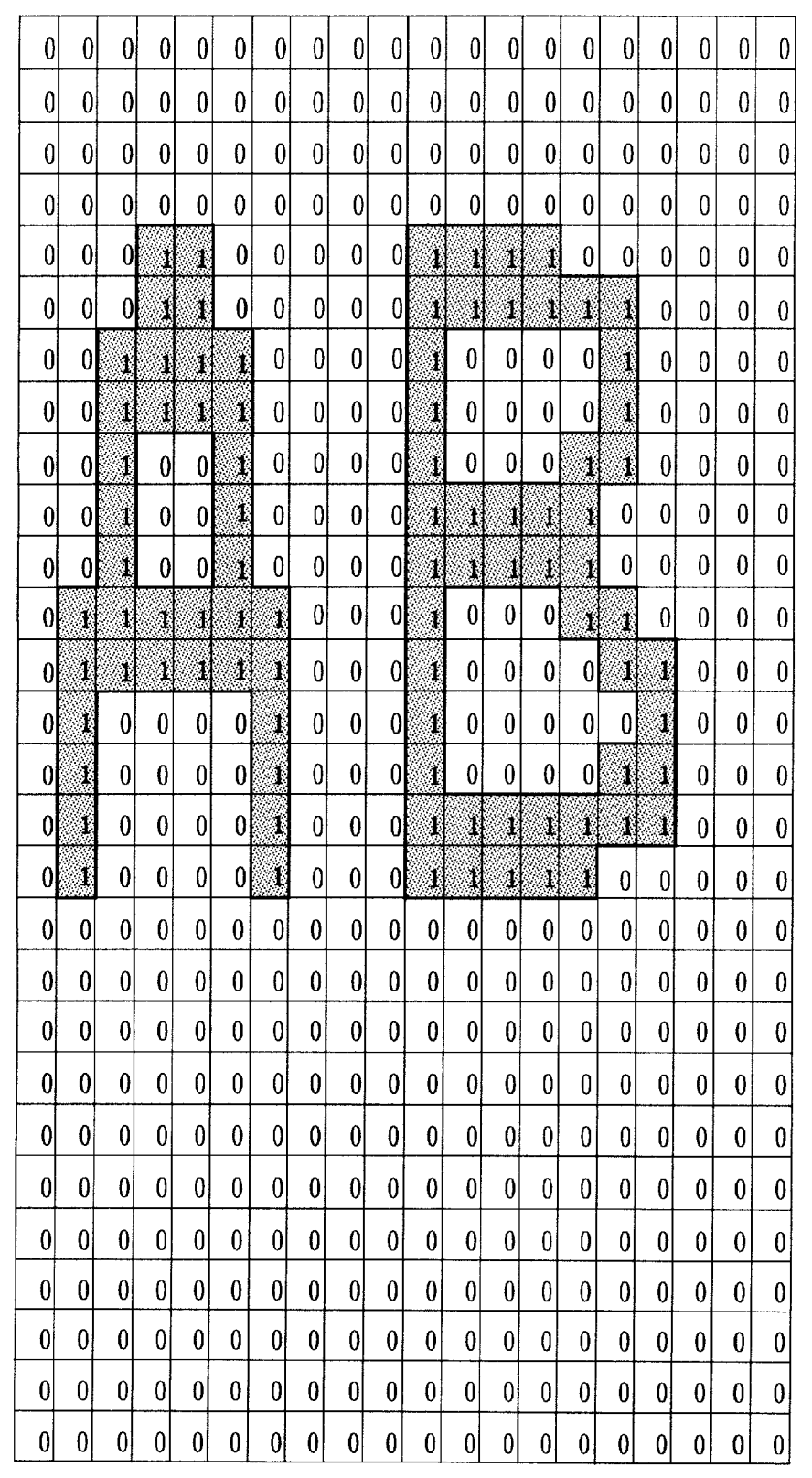

FIG. 10 is a diagram showing labeled images after integration processing has been performed.

In the example shown in FIG. 10, the label number 2 shown in FIG. 9 has been changed to the label number 1.

Returning to FIG. 2, in step S13, the coordinates of the labeled black pixel nearest the origin and those of the labeled black pixel furthest from the origin are acquired from the binary data recognized as a single cluster of black pixels in step S12. The above-described origin indicates a point in the corner of a reading area on a platen glass shown in FIG. 6.

A point A shown in FIG. 6 is the black pixel nearest the origin and indicates the position of a labeled black pixel. A point B shown in FIG. 6 is the black pixel furthest from the origin and indicates the position of a labeled black pixel. A rectangular area including the points A and B is recognized as a document area.

If the above-described points A and B are set, a labeled pixel may be present outside the rectangular document area that has the points A and B as vertexes. Therefore, the minimum value in the horizontal direction (the X axis direction shown in FIG. 6) and the minimum value in the vertical direction (the Y axis direction shown in FIG. 6) are extracted from the coordinates of all labeled pixels, and the coordinates having these minimum values may be set as the point A. Likewise, the maximum value in the horizontal direction and the maximum value in the vertical direction are extracted, and the coordinates having these maximum values may be set as the point B. If an area having the points A and B, which have been set as above, as vertexes is recognized as a document area, all labeled pixels can be included in the document area.

In the present application, the acquired two points are defined as the coordinates of the labeled black pixels nearest and furthest from the origin. The document area in this case may be considered as an area obtained using the coordinates of the origin and the labeled black pixel furthest from the origin, because a document is typically required to be put on so that the corner thereof is placed at the origin. The position of the origin may be other coordinates on the platen glass.

Returning to FIG. 2, in step S14, the document size determined in step S13 is checked. If the size has a value less than a predetermined value, the area having the size is determined as noise. Subsequently, in step S16, an alert is issued to an operator, and then the process is suspended.

In step S15, if the size has a value equal to or larger than a predetermined value, the area having the size is determined as a document. Subsequently, the determined area is extracted as a document.

FIG. 7 is a diagram showing an exemplary extraction result according to the exemplary embodiment.

Even if a plurality of clusters of labeled black pixels are extracted from a single document image read by the image processing apparatus 10, according to the above-described processing, these clusters can be extracted so that they can be fit into a single document. Even if a document such as a white document has an unrecognizable edge portion, an extraction rate can be increased in accordance with the integration processing for integrating extracted clusters of black pixels. Furthermore, since the finally determined document area size is checked, a detection error in which noise is detected as a document can be prevented.

According to the above-described exemplary embodiment, even if a plurality of clusters of labeled black pixels are extracted from a single document image read by the image processing apparatus 10, these clusters can be extracted so that they can be fit into a document.

Furthermore, according to the above-described exemplary embodiment, even if a document such as a white document has an unrecognizable edge portion, an extraction rate can be increased in accordance with the integration processing for integrating extracted clusters of black pixels.

According to the present invention, even if a plurality of clusters of labeled black pixels are extracted from a single document image read by the image processing apparatus 10, these clusters can be extracted so that they can be fit into a document.

While the present invention has been described with reference to an exemplary embodiment, it is to be understood that the invention is not limited to the disclosed exemplary embodiment. The scope of the following claims is to be accorded the broadest interpretation so as to encompass all modifications, equivalent structures and functions.

This application claims the benefit of Japanese Application No. 2005-257360 filed Sep. 6, 2005, which is hereby incorporated by reference herein in its entirety.

What is claimed is:

1. An image processing apparatus for extracting a document area, comprising:
    a reading unit for reading a document;
    a binarizing unit for binarizing read data acquired by the reading unit;
    a labeling unit for providing a same label number to adjacent black pixels that form a group of black pixels, the label number provided to each group of black pixels being unique, the black pixels being included in the read data binarized by the binarizing means;
    a noise removing unit for, when the number of black pixels in a group of black pixels counted on the basis of the unique label number is less than a predetermined number, determining that the black pixels provided with the unique label number are noise and removing the black pixels provided with the unique label number from targets to be processed;
    a coordinate acquiring unit for acquiring coordinate information of at least one of black pixels that remain after noise has been removed by the noise removing unit; and
    an extracting unit for extracting a document area on the basis of the coordinate information acquired by the coordinate acquiring unit,
    wherein the binarizing unit converts the read data into HSV color space data, and
    wherein the binarizing unit outputs a binarized image obtained by performing a logical OR operation upon three binarized images, which are (1) a binarized image obtained by comparing a color value (V) component data of the HSV color space data with a threshold value, (2) a binarized image obtained by extracting an edge of the color value (V) component data of the HSV color space data by an edge detection filter, and (3) a binarized image obtained by comparing a color saturation value (S) component data of the HSV color space data with a threshold value.

2. The image processing apparatus according to claim 1,
    wherein the coordinate information acquired by the coordinate acquiring unit includes information on the coordinates of two points, a black pixel nearest an origin and a black pixel furthest from the origin, and
    wherein the extracting unit extracts a rectangular area that includes the coordinates of the two points which have been acquired by the coordinate acquiring unit as the document area.

3. The information processing apparatus according to claim 1,
    wherein the coordinate information acquired by the coordinate acquiring unit includes information on the coordinates of both an origin and a black pixel furthest from the origin, and wherein the extracting unit extracts a rectangular area that includes the coordinates of one point acquired by the coordinate acquiring unit and the origin as the document area.

4. The information processing apparatus according to claim 1,
wherein the coordinate information acquired by the coordinate acquiring unit includes information on the coordinates of two points, one having minimum values in a vertical and a horizontal directions the other one having maximum values in a vertical and a horizontal direction, wherein the minimum and maximum values are extracted from among coordinate information on the black pixels, and
wherein the extracting unit extracts a rectangular area that includes the coordinates of the two points acquired by the coordinate acquiring unit as the document area.

5. The image processing apparatus according to claim 1, further comprising a document determining unit for, when an extracted document area size has a value less than a predetermined value, determining that there is no document.

6. The image processing apparatus according to claim 5, further comprising an informing unit for, when it is determined by the document determining unit that there is no document, suspending a process and providing notification that there is no document.

7. A method of controlling an image processing apparatus, including a reading unit and a binarizing unit, for extracting a document area, the controlling method comprising:
reading a document by the reading unit;
binarizing read data by the binarizing unit;
providing a same label number to adjacent black pixels that form a group of black pixels, the label number provided to each group of black pixels being unique, the black pixels being included in binarized read data;
determining, when the number of black pixels in a group of black pixels counted on the basis of the unique label number is less than a predetermined number, that the black pixels provided with the unique label number are noise and removing the black pixels provided with the unique label number from targets to be processed;
acquiring coordinate information of at lest one of black pixels that remain after noise has been removed; and
extracting a document area on the basis of the acquired coordinate information,
wherein the binarizing unit converts the read data into HSV color space data, and
wherein the binarizing unit outputs a binarized image obtained by performing a logical OR operation upon three binarized images, which are (1) a binarized image obtained by comparing a color value (V) component data of the HSV color space data with a threshold value, (2) a binarized image obtained by extracting an edge of the color value (V) component data of the HSV color space data by an edge detection filter, and (3) a binarized image obtained by comparing a saturation value (S) component data of the HSV color space data with a threshold value.

8. A method of controlling an image processing apparatus according to claim 7, wherein the acquired coordinate information includes information on the coordinates of two points, a black pixel nearest an origin and a black pixel furthest from the origin, and wherein a rectangular area including coordinates of the two points is extracted as the document area.

9. A method of controlling an image processing apparatus according to claim 7, wherein the acquired coordinate information includes information on the coordinates of both an origin and a black pixel furthest from the origin, and wherein a rectangular area including coordinates of one point of the acquired coordinate information and the origin is extracted as the document area.

10. A method of controlling an image processing apparatus according to claim 7, wherein the acquired coordinate information includes information on the coordinates of two points, one having minimum values in a vertical and a horizontal direction, the other one having maximum values in a vertical and a horizontal direction, wherein the minimum and maximum values are extracted from among coordinate information in the black pixels, and wherein a rectangular area including coordinates of the two points is extracted as the document area.

11. A method for controlling an image processing apparatus according to claim 7, further comprising determining, when an extracted document area size has a value less than a predetermined value, that there is no document.

12. A method for controlling an image processing apparatus according to claim 11, further comprising providing notification, when it is determined that there is no document, that there is no document.

13. A non-transitory computer-readable storage medium for storing the computer-executable process steps for causing a computer to execute the method of claim 7.

* * * * *